(12) United States Patent
Hurley et al.

(10) Patent No.: US 6,895,930 B2
(45) Date of Patent: May 24, 2005

(54) ADAPTIVE POWER CONTROL FOR VEHICLE ENGINE

(75) Inventors: Richard Hurley, Rochester Hills, MI (US); Stephen Baker, Oxford, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/786,194

(22) Filed: Feb. 25, 2004

(65) Prior Publication Data

US 2004/0204799 A1 Oct. 14, 2004

Related U.S. Application Data

(60) Provisional application No. 60/461,259, filed on Apr. 8, 2003.

(51) Int. Cl.[7] ................................................. F02D 9/08
(52) U.S. Cl. .......................... 123/399; 701/1; 701/110
(58) Field of Search .............................. 123/399; 701/1, 701/54, 93, 103, 110

(56) References Cited

U.S. PATENT DOCUMENTS

| | | | |
|---|---|---|---|
| 6,134,499 A | | 10/2000 | Goode et al. |
| 6,202,021 B1 | | 3/2001 | Kresse et al. |
| 6,454,676 B1 | * | 9/2002 | Date et al. ..................... 477/77 |
| 6,584,392 B1 | * | 6/2003 | Jankovic et al. .............. 701/54 |

* cited by examiner

*Primary Examiner*—Hai Huynh

(57) ABSTRACT

An engine management system monitors driving habits of a vehicle operator over time to generate a driver profile. The driver profile is used to adjust available engine power to more closely match the driver's habits. A predetermined nominal engine power versus vehicle speed range is established for an engine. A system controller monitors and compares the driver power requests to the nominal engine power versus vehicle speed range over time to determine the driver profile. The system controller also monitors current vehicle speed to determine whether the vehicle is operating at a low or high vehicle speed. The controller determines low and high speed engine power correction factors based on this driver profile. The appropriate correction factor is applied to modify the available engine power resulting in an engine power output that more closely matches an operator's driving tendencies.

17 Claims, 1 Drawing Sheet

ADAPTIVE POWER CONTROL FOR VEHICLE ENGINE

The application claims priority to U.S. Provisional Application No. 60/461,259, which was filed on Apr. 8, 2003.

BACKGROUND OF THE INVENTION

Traditionally, there have been mechanical connections between a vehicle accelerator pedal and the vehicle engine. These mechanical connections typically include throttle cables that move in response to the accelerator pedal being actuated by an operator. Movement of the throttle cable controls the engine output power based on the amount of force the operator has applied to the accelerator pedal.

The automotive industry is constantly trying to eliminate mechanical connections by incorporating electronically controlled systems into vehicles. One such system is the electronic throttle control (ETC) system. An ETC generates an electronic signal that is representative of pedal position. This information is communicated to an engine controller, which in turn determines the amount of power that should be supplied in response to a vehicle operator's request. Typically, the controller utilizes a look-up table that lists set engine responses for each accelerator pedal position. This engine control response originated from a system that utilized the direct mechanical connection where a set pedal position corresponded to a specific carburetor position, i.e. specific engine power response.

In the past, some engine management systems have used accelerator pedal position with current engine speed to determine the engine power set point. In response to a driver power request, the pedal position and engine speed are compared in a look-up table to determine a factor of the available engine power. One disadvantage with these ETC systems is that the systems are not capable of modifying engine power output to accommodate different driving applications or different driving habits.

There is a need for an engine management system that can accommodate driving differences. Because there is no direct mechanical connection with an ETC, it is possible to vary the response of the engine. This means that the same engine can be used in a variety of different vehicle applications by using an adaptive engine management system, which adjusts engine power output based on past driving tendencies and habits as well as using traditional ETC inputs. For example, the same engine may be used in different trucks that range from light duty trucks to heavy duty trucks. This engine may be slightly over-powered for the light duty trucks and slightly under-powered for the heavy duty trucks. Further, an aggressive driver of a heavy vehicle might drive differently than a non-aggressive driver of a lighter vehicle.

Thus, there is a need to vary the response of the engine to give the aggressive driver more response for a given accelerator pedal position while the non-aggressive driver would be given less response for that same pedal position. The engine management should be capable of learning and storing driver habits and tendencies over time to provide an adaptive engine output. A varied response is beneficial because it provides more resolution above and below nominal operating limits.

SUMMARY OF THE INVENTION

An engine management system utilizes pedal position, engine speed, and vehicle speed to determine an engine power set point. The system monitors and saves driver habits and tendencies over time to adjust the engine power set point relative to a nominal engine power versus vehicle speed range. This adaptive system allows a common engine to be used in different types of vehicles by adjusting engine power output to accommodate light duty or heavy duty vehicle applications, and/or to accommodate aggressive or non-aggressive drivers.

In one disclosed embodiment, the method for adjusting engine power in response to a driver power request includes the following steps. A predetermined nominal engine power versus vehicle speed range is determined for the engine. Driver power requests are monitored over time and are compared to the nominal range to determine a driver profile. An engine power correction factor is determined based on this driver profile. A system controller uses this correction factor to adjust engine power output for subsequent driver power requests.

In one disclosed embodiment, the vehicle speed range is divided into a plurality of speed zones. The nominal engine power versus vehicle speed range extends through each of the speed zones. Each speed zone is then sub-divided into an upper zone, above the nominal engine power versus vehicle speed range, and a lower zone, below the nominal engine power versus vehicle speed range. Timers monitor the amount of time that each driver power request remains in one of the upper or lower zones for each of the speed zones to establish a plurality of zone times. Total engine running time is also measured. Each zone time is divided by the total engine running time to determine a percentage of time spent in each zone. The driver profile is determined based on these percentages. Predetermined calibration tables and known constants are used to determine a factor or gain for each of the speed zones. The factors are compared to a predetermined constant. The factors are incremented by a predetermined amount if the factor is greater than the constant and decremented by a predetermined amount if the factor is less than the constant.

The factors are then used to determine the engine correction factors or gains for a vehicle high speed range and a vehicle low speed range. The high and low speed correction factors are used to modify available engine torque outputs as determined by a pedal map. The subject invention utilizes a low speed pedal map and a high speed pedal map. The pedal maps compare pedal position to engine speed to determine the available engine torque. If vehicle speed is less than a predetermined low speed value, the torque is modified by the low speed correction factor. If vehicle speed is greater than a predetermined high speed value, the torque is modified by the high speed correction factor. If vehicle speed is between the predetermined high and low speed values, the engine torque is modified by an interpolated value of the high and low speed correction factors.

The subject method and apparatus provides an engine management system that can vary engine response based on driver tendencies. The adaptive system allows a common engine to be used in different vehicle applications while also accommodating aggressive and non-aggressive driving habits. These and other features of the present invention can be best understood from the following specification and drawings, the following of which is a brief description.

DETAILED DESCRIPTION OF THE PREFERRED EMBODIMENT

Figure 1:
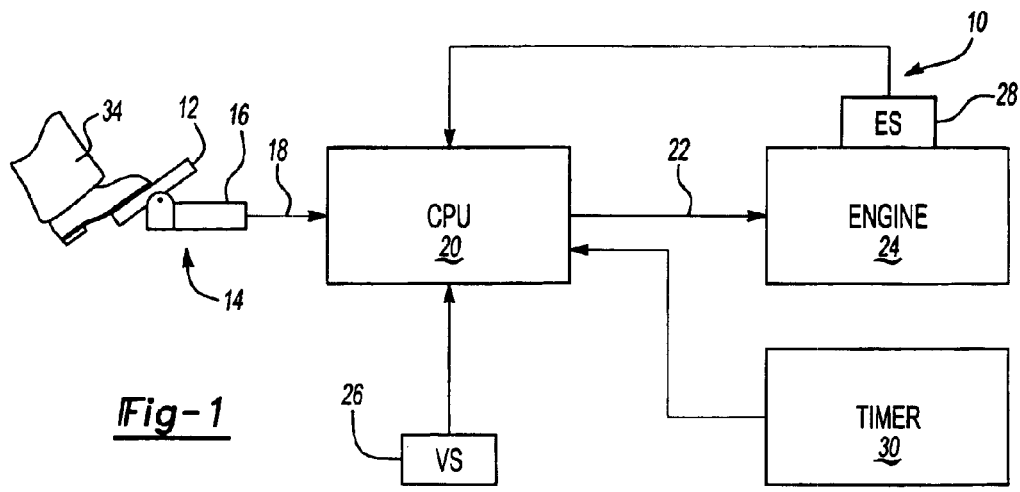
FIG. 1 illustrates a schematic view of an engine management system incorporating the subject invention.

An engine management system incorporating the subject invention is shown generally at 10 in FIG. 1. The engine management system includes an accelerator pedal 12 with electronic throttle control (ETC) 14. The ETC 14 includes a pedal position sensor 16 and generates a pedal signal 18 that is communicated to a system controller 20. The controller 20 generates an engine signal 22 that controls power output for a vehicle engine 24. The operation of ETC 14 systems is well-known in the art and will not be discussed in detail. Further, it should be understood that the controller 20 could be a main vehicle control unit or a separate engine control unit.

A vehicle speed sensor 26 and an engine speed sensor 28 communicate with the controller 20. A timing assembly 30 is used to monitor total engine running time. The controller 20 uses the vehicle speed, engine speed, engine running time, and pedal position information to determine an engine power set point. The controller 20 monitors and stores driver power requests over time to modify the engine power set point to more closely match driving habits and tendencies of the driver. This will be discussed in greater detail below.

A driver power request is generated by depressing the accelerator pedal 12. This power request is compared to a nominal engine power versus speed range 32, shown in FIG. 2. This nominal engine power versus speed range 32 corresponds to a typical engine power output matched with a specific vehicle speed for the engine 24. Thus, the nominal engine power versus speed range 32 will vary for each engine and depends upon the type of engine and the type of vehicle application in which the engine will be operating.

Figure 2:
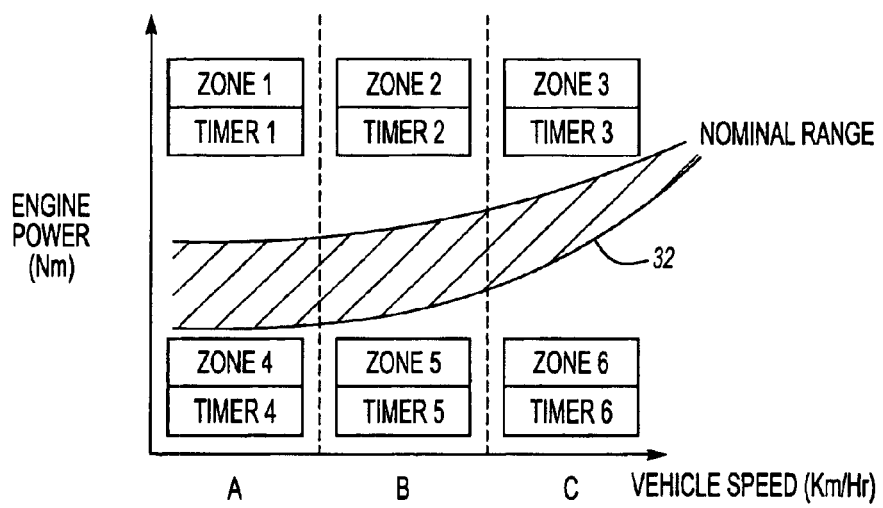
FIG. 2 illustrates an engine power vs. vehicle speed graph divided into a plurality of speed zones.

As shown in FIG. 2, the engine power vs. vehicle speed table is divided into at least three (3) speed zones A, B, C. The nominal engine power versus speed range 32 extends through each of these speed zones A, B, C. Each speed zone A, B, C is then sub-divided into an upper zone and a lower zone. The upper zone corresponds to power requests that are greater than the nominal engine power versus speed range 32 for that zone, while the lower zone corresponds to power requests that are less than the nominal engine power versus speed range 32 for that zone. Speed zone A has an upper zone (ZONE 1); speed zone B has an upper zone (ZONE 2); and speed zone C has an upper zone (ZONE 3). Speed zone A has a lower zone (ZONE 4); speed zone B has a lower zone (ZONE 5); and speed zone C has a lower zone (ZONE 6).

Each upper and lower zone includes a zone timer that measures the amount of time that a driver power request remains in the respective zone. Thus, ZONE 1 has a timer (TIMER 1), ZONE 2 has a timer (TIMER 2), ZONE 3 has a timer (TIMER 3), ZONE 4 has a timer (TIMER 4), ZONE 5 has a timer (TIMER 5), and ZONE 6 has a timer (TIMER 6). These timers can be incorporated into the timing assembly 30, which monitors total engine running time, or can be incorporated into the system 10 as separate timers.

A driving cycle begins when a driver 34 turns the vehicle on and starts driving. During the driving cycle, the driver 34 will vary the pressure force applied to the accelerator pedal 12. The timers in each zone measure the length of time that the driver's power request remains in that respective zone. Thus, each timer will have a time output for the driving cycle. The time output from ZONE 1 is T1, the time output from ZONE 2 is T2, the time output from ZONE 3 is T3, the time output from ZONE 4 is T4, the time output from ZONE 5 is T5, and the time output from ZONE 6 is T6. Each time output from the zones is then divided by the total engine driving time Tt to determine percentage of time spent in each of the zones. Thus, for example T1 is divided by Tt to determine the percentage of time Z1 spent in ZONE 1.

$$T1/Tt=Z1 \quad T4/Tt=Z4$$

$$T2/Tt=Z2 \quad T5/Tt=Z5$$

$$T3/Tt=Z3 \quad T6/Tt=Z6$$

At the end of the driving cycle, i.e. when the vehicle is turned off, the controller 20 then determines a zone factor for each of the zones Fa, Fb, Fc. The controller 20 only determines these zone factors Fa, Fb, Fc if the total engine driving time Tt is greater than a predetermined minimum amount of time. This ensures that the sample set is sufficiently large enough to provide an accurate characterization of the driver's habits and tendencies. The zone factors Fa, Fb, Fc are calculated as follows:

$$Fa=(Gz_1 \times Z1)-(Gz_4 \times Z4)$$

$$Fb=(Gz_2 \times Z2)-(Gz_5 \times Z5)$$

$$Fc=(Gz_3 \times Z3)-(Gz_6 \times Z6)$$

$Gz_1$ through $Gz_6$ are known calibration constants that are dependent upon engine type, vehicle application, and duty cycle and can be stored in calibration tables for access by the controller 20.

Once the zone factors Fa, Fb, Fc are determined, a comparison is made to a zone constant C. The zone constants are known calibration constants that are dependent on engine type, vehicle application, etc., and can be stored in calibration tables for access by the controller 20. Thus, zone factor Fa is compared to zone constant Caa. If Fa is greater than Caa then Fa is incremented by a predetermined amount Ia (Fa+Ia). If Fa is less than Caa then Fa is decremented by a predetermined amount Ia (Fa−Ia). This incremented or decremented value corresponds to a gain for that zone, i.e. corresponds to a modified zone factor.

If $Fa>Caa$ then $Fa+Ia=$Gain_Pa If $Fa<Caa$ then $Fa-Ia=$Gain_Pa

If $Fb>Cbb$ then $Fb+Ib=$Gain_Pb If $Fb<Cbb$ then $Fb-Ib=$Gain_Pb

If $Fc>Ccc$ then $Fc+Ic=$Gain_Pc If $Fc<Ccc$ then $Fc-Ic=$Gain_Pc

Thus, for example, if the increment value was 5% and Fa was greater than Caa, Fa would be incremented by 5% (0.05). These modified zone factors Gain_Pa, Gain_Pb, Gain_Pc are then used to determine low and high speed gains or skew factors. The low speed gain $G_{LS}$ and the high speed gain $G_{HS}$ are calculated as follows:

$$G_{LS}=(\text{Gain\_Pa} \times C_{LS})+\text{Gain\_Pb}\,(1-C_{LS})$$

$$G_{HS}=(\text{Gain\_Pc} \times C_{HS})+\text{Gain\_Pb}\,(1-C_{HS})$$

$C_{LS}$ and $C_{HS}$ are known constants that depend on engine type, vehicle application, and duty cycle, etc. and are stored in the controller 20.

Figure 3:
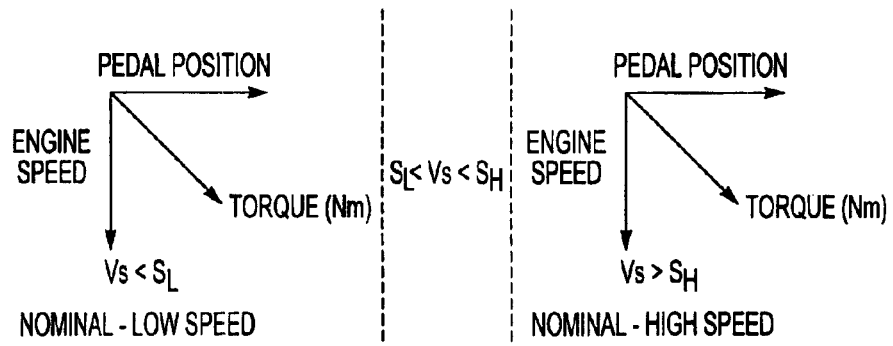
FIG. 3 illustrates high and low speed pedal maps for determining available engine torque based on pedal position vs. engine speed.

The low speed gain $G_{LS}$ and the high speed gain $G_{HS}$ are used to modify an engine output torque as determined by use of a pedal map. As shown in FIG. 3, a pedal map uses current engine speed and pedal position to identify a corresponding engine output torque. The subject invention modifies this output torque with the low speed gain $G_{LS}$ and the high speed gain $G_{HS}$ factors.

This is accomplished by incorporating current vehicle speed into the analysis. Preferably, the controller 20 utilizes two (2) pedal maps, one for low vehicle speeds and one for high vehicle speeds. Current vehicle speed Vs is measured and compared to a predetermined low speed value $S_L$ and/or a predetermined high speed value $S_H$. If the current vehicle speed Vs is less than the predetermined low speed value $S_L$ then the engine torque from the low speed pedal map is multiplied by the low speed gain, (Torque×$G_{LS}$). If the current vehicle speed Vs is greater than the predetermined high speed value $S_H$ then the engine torque from the high speed pedal map is multiplied by the high speed gain, (Torque×$G_{HS}$). If the current vehicle speed Vs is greater than the predetermined low speed value and less than the predetermined high speed value, then the engine torque is modified by an interpolated value of the high and low speed gains $G_{HS}$, $G_{LS}$ based on the vehicle speed, i.e. the engine torque is modified by estimating a gain value between the two known gain values $G_{HS}$, $G_{LS}$ based on the vehicle speed.

This process is continuously updated for each driving cycle. This means that running high and low speed gain factors or skew factors are calculated over the life of the vehicle. When a driver consistently drives a vehicle at below nominal power requests, the skew factor is lowered for that vehicle speed range. A vehicle with lower weight or a less aggressive driver would be covered by this modification.

The skew factor would only be changed after the driving cycle is completed so that the driving conditions would not change while a driver operates the vehicle. Further, each of the zone factors Fa, Fb, Fc has a predetermined maximum change limit for each driving cycle. This prevents too great of a change from occurring between immediately adjacent driving cycles.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for adjusting engine power in response to a driver power request comprising the steps of:
   (a) establishing a predetermined nominal engine power versus vehicle speed range;
   (b) monitoring and comparing driver power requests to the nominal engine power versus vehicle speed range over time to determine a driver profile;
   (c) determining at least one engine power correction factor based on the driver profile;
   (d) initiating a subsequent engine power request; and
   (e) applying the correction factor to available engine power to provide a modified engine power output.

2. The method of claim 1 wherein step (a) further includes the steps of dividing the vehicle speed range into a plurality of speed zones, establishing the nominal engine power versus vehicle speed range to extend through each of the speed zones, and sub-dividing each speed zone into an upper speed zone above the nominal engine power versus vehicle speed range and a lower speed zone below the nominal engine power versus vehicle speed range.

3. The method of claim 2 wherein step (b) further includes the steps of timing an amount of time that each driver power request remains in one of the upper or lower speed zones for each of the speed zones to establish a plurality of zone times, measuring total engine running time, dividing each zone time by the total engine running time to determine a percentage of time spent in each zone, and determining the driver profile based on the percentage of time spent in each zone.

4. The method of claim 3 wherein determining at least one engine power correction factor in step (c) further includes the steps of determining a zone correction factor for each speed zone based on a comparison of the percentage of time spent in each zone for the respective upper and lower speed zones, comparing each zone correction factor to a predetermined zone constant, incrementing each zone correction factor by a first predetermined amount if the zone correction factor is greater than the predetermined zone constant, decrementing each zone correction factor by a second predetermined amount if the zone correction factor is less than the predetermined zone constant, and generating a modified zone correction factor based on the incremented or decremented zone factor.

5. The method of claim 4 wherein step (c) further includes the steps of determining a low speed gain and a high speed gain based on the modified zone correction factors.

6. The method of claim 5 wherein step (d) further includes the steps of determining an accelerator pedal position and determining a current engine speed in response to the engine power request, and determining available engine torque by comparing the pedal position and engine speed.

7. The method of claim 6 wherein step (e) further includes the steps of establishing a predetermined low vehicle speed value and a predetermined high vehicle speed value, modifying available engine torque by the low speed gain if current vehicle speed is less than the predetermined low vehicle speed value, modifying the available engine torque by the high speed gain if current vehicle speed is greater than the predetermined high vehicle speed value, and modifying the available engine torque by an interpolation of the low and high speed gains if the current vehicle speed is greater than the predetermined low vehicle speed value and less than the predetermined high vehicle speed value.

8. The method of claim 4 including the step of only determining the zone correction factor for each speed zone if the total engine running time is greater than a predetermined minimum amount of time.

9. A method for adjusting engine power in response to a driver power request comprising the steps of:
   (a) establishing a predetermined nominal engine power versus vehicle speed range;
   (b) monitoring and comparing driver power requests to the nominal engine power versus vehicle speed range over time to determine a driver profile;
   (c) initiating an engine power request;
   (d) determining an accelerator pedal position and a current engine speed in response to the engine power request;
   (e) determining available engine torque by comparing the pedal position and engine speed;
   (f) comparing current vehicle speed to at least one of a predetermined low vehicle speed value and a predetermined high vehicle speed value;
   (g) determining a low speed engine power correction factor and a high speed engine power correction factor based on the driver profile; and
   (h) modifying available engine torque by the low speed engine power correction factor if current vehicle speed is less than the predetermined low vehicle speed value, modifying the available engine torque by the high speed engine power correction factor if current vehicle speed is greater than the predetermined high vehicle speed value, and modifying the available engine torque by an interpolation of the low and high speed engine power correction factors if the current vehicle speed is greater than the predetermined low vehicle speed value and less than the predetermined high vehicle speed value.

10. The method of claim 9 further including the steps of dividing the vehicle speed range into a plurality of speed zones, establishing the nominal engine power versus vehicle speed range to extend through each of the speed zones, and sub-dividing each speed zone into an upper speed zone that is greater than the nominal engine power versus vehicle speed range and a lower speed zone that is less than the nominal engine power versus vehicle speed range.

11. The method of claim 10 further including the steps of timing an amount of time that each driver power request remains in one of the upper or lower speed zones for each of the speed zones to establish a plurality of zone times, measuring total engine running time, dividing each zone time by the total engine running time to determine a percentage of time spent in each zone, and determining the driver profile based on the percentage of time spent in each zone.

12. The method of claim 11 further including the steps of determining a zone correction factor for each speed zone based on a comparison of the percentage of time spent in each zone for the respective upper and lower speed zones, comparing each zone correction factor to a predetermined zone constant, incrementing each zone correction factor by a first predetermined amount if the zone correction factor is greater than the predetermined zone constant, decrementing each zone correction factor by a second predetermined amount if the zone correction factor is less than the predetermined zone constant, and generating a modified zone correction factor based on the incremented or decremented zone factor.

13. The method of claim 12 including the steps of determining the low speed engine power correction factor and the high speed engine power correction factor based on the modified zone correction factors.

14. An engine management system for adjusting engine power in response to a driver power request comprising:
   an engine;
   an accelerator pedal movable between a non-applied position and an applied position wherein said pedal generates an electronic signal to request engine power in response to being moved to the applied position;
   a first sensor for measuring accelerator pedal position in response to an engine power request;
   a second sensor for measuring current engine speed in response to the engine power request;
   a third sensor for measuring vehicle speed during the engine power request; and
   an electronic controller having a database including a predetermined nominal engine power versus vehicle speed range for the engine wherein said controller monitors and compares engine power requests to said nominal engine power versus vehicle speed range over time to determine a driver profile, determines available engine torque by comparing pedal position and current engine speed, determines a low speed engine power correction factor and a high speed engine power correction factor based on said driver profile, and modifies available engine torque by said low speed engine power correction factor if current vehicle speed is less than said predetermined low vehicle speed value, or modifies the available engine torque by said high speed engine power correction factor if current vehicle speed is greater than said predetermined high vehicle speed value, or modifies the available engine torque by an interpolation of said low and high speed engine power correction factors if the current vehicle speed is greater than said predetermined low vehicle speed value and less than said predetermined high vehicle speed value.

15. The system of claim 14 wherein the vehicle speed range is divided into a plurality of speed zones with said nominal engine power versus vehicle speed range extending through each of said speed zones, and wherein each speed zone is sub-divided into an upper speed zone that is greater than the nominal engine power versus vehicle speed range and a lower speed zone that is less than the nominal engine power versus vehicle speed range.

16. The system of claim 15 including a timer for each of said upper and lower speed zones wherein each timer times an amount of time that each driver power request remains in said respective upper or lower speed zone to establish a plurality of zone times, and including an engine timer that measures total engine running time wherein said controller divides each of said zone times by said total engine running time to determine a percentage of time spent in each zone with said driver profile being based on said percentage of time spent in each zone.

17. The system of claim 16 wherein said controller determines a zone correction factor for each of said speed zones based on a comparison of said percentage of time spent in each zone for said respective upper and lower speed zones, compares each zone correction factor to a predetermined zone constant, increments each zone correction factor by a first predetermined amount if said zone correction factor is greater than said predetermined zone constant, decrements each zone correction factor by a second predetermined amount if said zone correction factor is less than said predetermined zone constant, generates a modified zone correction factor based on the incremented or decremented zone factor, and determines said low speed engine power correction factor and said high speed engine power correction factor based on said modified zone correction factors.

* * * * *